W. F. HUDSON.
PROPULSION CONNECTION FOR MOTOR VEHICLES.
APPLICATION FILED MAY 15, 1919.
1,341,615.
Patented May 25, 1920.
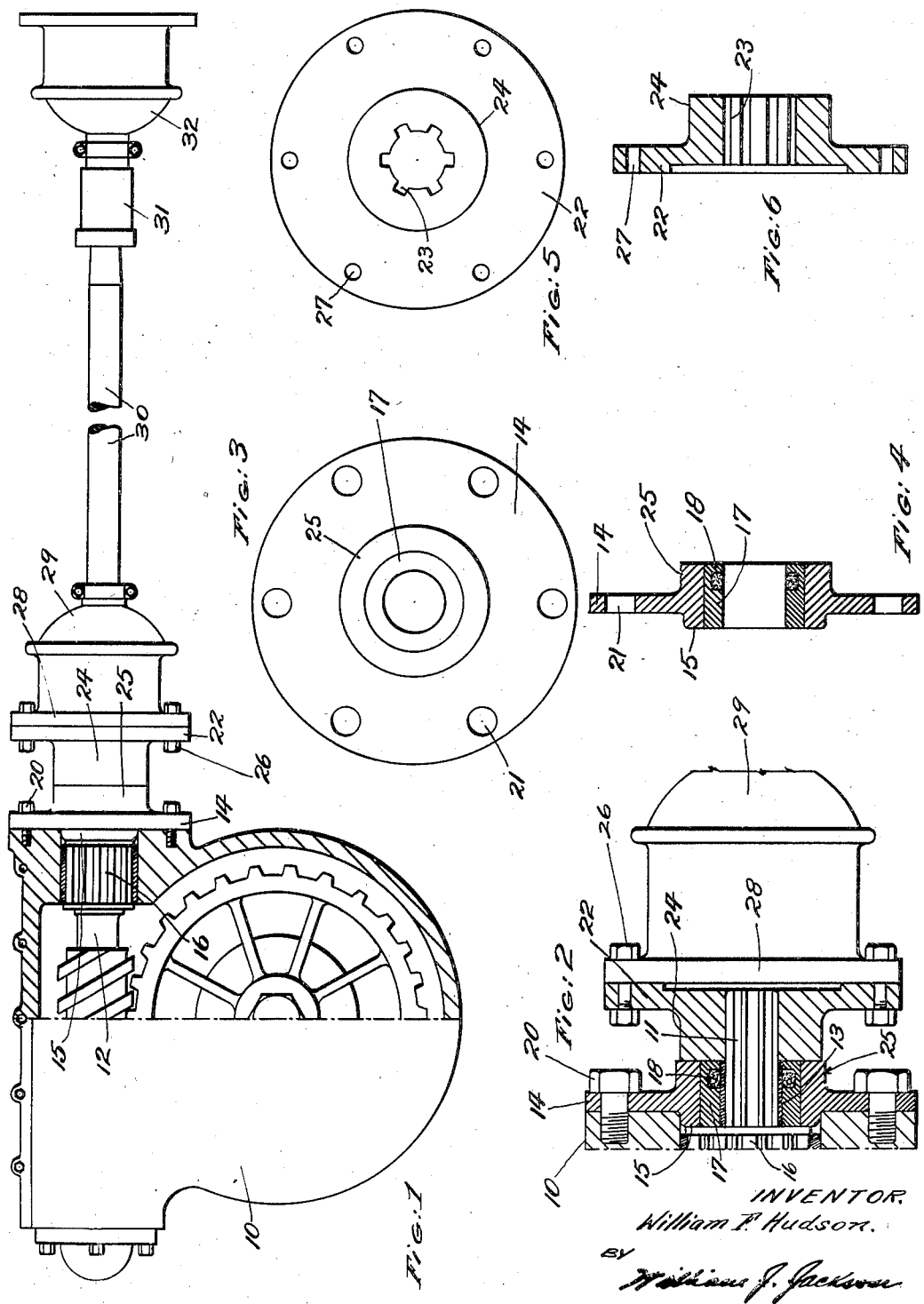
INVENTOR.
William F. Hudson.
BY
William J. Jackson
ATTORNEY.

UNITED STATES PATENT OFFICE.

WILLIAM F. HUDSON, OF PHILADELPHIA, PENNSYLVANIA, ASSIGNOR TO HUDSON MOTOR SPECIALTIES COMPANY, OF PHILADELPHIA, PENNSYLVANIA, A CORPORATION OF PENNSYLVANIA.

PROPULSION CONNECTION FOR MOTOR-VEHICLES.

1,341,615.   Specification of Letters Patent.   Patented May 25, 1920.

Application filed May 15, 1919. Serial No. 297,395.

*To all whom it may concern:*

Be it known that I, WILLIAM F. HUDSON, a citizen of the United States, residing at the city of Philadelphia, county of Philadelphia, and State of Pennsylvania, have invented a certain new and useful Improved Propulsion Connection for Motor-Vehicles, of which the following is a specification.

This invention, generally stated, relates to motor-vehicle constructions and has more particular relation to means for securing propulsion means with respect to the worm-drive of a truck. It is customary in the construction of worm-driven trucks of certain models, to couple the power transmission direct to the worm-shaft by means of a propeller shaft rigidly connected fore and aft and rigid throughout its length. Such propeller is contained within a casing which is bolted at one end to the housing or casing containing the worm-drive and is bolted at its other end to the transmission casing. Consequently the entire connection between the transmission and the worm-drive possesses no flexibility. Rigidity of connection is very undesirable for various reasons. As an illustration:—In backing a truck for loading or unloading purposes the rear wheels thereof frequently come in contact with a curb or the like and the jar or jolt resulting from such impact is referred to various portions of the truck mechanism, causing disalinement, stress, strains and frequently breakage of parts.

It may be said to be a leading object of the present invention to provide a propulsion connection possessed of such flexibility that jars and jolts as may be referred from the rear axle are absorbed by the propulsion means without detrimental effect to the vehicle mechanism. Another object is that of utilizing the worm drive and its casing as manufactured and connecting with respect thereto comparatively few and simple elements for attaining the results recited by the leading object whereby unskilled labor may readily effect a substitution of parts. Other and further objects relate to the provision of flexible propulsion means connected in a new and novel manner with a worm-drive in which connection is combined efficiency, practicability and comparative cheapness with the end in view of commercially bettering truck construction.

The invention consists of the improvements hereinafter described and finally claimed.

The nature, characteristic features and scope of the invention will be more fully understood from the following description taken in connection with the accompanying drawings forming part hereof, and in which:—

Figure 1, is a view in side elevation, partly sectioned, illustrating a connection of worm-drive and propulsion means embodying features of the present invention.

Fig. 2, is a fragmentary view principally in section illustrating details of construction.

Figs. 3 and 4, are respectively a face view and a sectional view of one of the plates shown in Figs. 1 and 2, and Figs. 5 and 6, are similar views of another of the plates shown in Figs. 1 and 2.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In practising the present invention I first disconnect from between the worm-drive housing and the transmission casing of a commercial vehicle, of certain model, the propeller shaft casing and then disconnect the propeller shaft from between the worm-shaft and the power transmission. This propeller shaft is of the rigidly connected type and has splined-joint relation with the worm-shaft. With such propeller shaft and its casing removed there is left protruding from the worm-drive housing 10 the splined end 11 of the worm-shaft 12. It is this projecting end of the worm-shaft with which the removed propeller shaft had splined-joint relation.

I may if desired now fit over a portion of the length of the splined-shaft end a section of tubing 13 to provide a smooth bearing surface. Over this tubing 13 if employed is fitted a plate 14 of disk-form having a central passage therethrough, each face of said plate having an annular flanged part of which flanged part 15 engages within the recessed part of housing 10 containing a roller bearing 16 in which the worm-shaft is rotatably mounted. Fitted within the central passage of said plate is a suitable bearing. In the drawings a plain bearing 17 of bronze or the like is shown although obviously other bearings such as the ball and roller types may be employed. A washer 18 of felt or equivalent material is employed to prevent the escape of lubricant from casing 10. In practice the plate 14 is fixed to the housing 10 by means of the same bolts which clamped the propeller casing to place. The bolts are designated 20 and the plate 14 is apertured as at 21 to accommodate the same.

I next fit to place upon the protruding end of the worm-shaft a plate 22 of disk-form provided upon each face with an annular flanged part and having a central passage therethrough. This passage is grooved as at 23 to coöperatively engage the splined portion of the worm-shaft not covered by plate 14. The worm-shaft and plate 22 thus have splined-joint relation for rotation in unison. Fitted to place, the flanged part 24 of plate 22 abuts against the flanged part 25 of plate 14. It will thus be understood that plate 22 and the worm-shaft move in unison and that the worm-shaft is rotatably mounted in fixed plate 14. While I have described the worm-shaft as being splined obviously other modes of connecting the propulsion means with the worm-shaft may be employed as is well understood in the art. Likewise different forms of propulsion means may be employed but the following description will be limited to a single type for illustrative purposes. To plate 22 is now clamped, as by bolts 26 passing through apertures 27 in the plate 22, the flange 28 of a universal joint 29 carried by a propeller shaft 30. The opposite end of the propeller shaft is provided with a slip-joint 31 and a universal joint 32. The universal joint 32 is connected to the motor transmission which connection forms no part of the present invention. Thus connected any jars or jolts as may be referred from the rear axle to the propeller shaft are absorbed by reason of the slip-joint 31. By the above described simple and efficient connection, trucks having a rigid connection of propeller casing and propeller shaft may be easily altered by unskilled labor.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim:—

1. In a construction of the character stated a worm and its complemental shaft, a housing therefor having an opening through which said shaft projects, a bearing for said shaft fitted within said opening, propelling means, a disk-like plate fixed to said housing said plate being provided with annular flanges one of which is fitted within said opening, a bearing in said plate in which bearing a part of the projected shaft end is rotatable and a disk-like plate fixed to said propelling means for coöperatively engaging the remaining part of said shaft for causing the propelling means and worm to rotate in unison the last mentioned plate having an annular flange in abutting relation with the outermost flange of the first mentioned plate.

2. In a construction of the character stated a worm having a shaft provided with a splined end, a housing therefor having an opening through which projects the splined end of said shaft, a bearing for said shaft fitted within said opening, propelling means, a disk-like plate fixed to said housing said plate being provided with annular flanges one of which is fitted within said opening, a bearing in said plate in which bearing a part of the splined end of said shaft is rotatable and a disk-like plate fixed to said propelling means for coöperatively engaging the remaining part of the splined end of said shaft for causing the propelling means and worm to rotate in unison, the last mentioned plate having an annular flange in abutting relation with the outermost flange of the first mentioned plate.

3. In a construction of the character stated a worm and its complemental shaft, a housing therefor through which projects an end of said shaft, propelling means, a plate having a removable bearing therein fitted over a part of said projected shaft end, means for clamping said plate to said housing, a second plate for coöperatively engaging over the remainder of said projected shaft end and means for clamping the last mentioned plate to said propelling means.

4. In a construction of the character stated a worm and its complemental shaft, a housing therefor through which projects an end of said shaft, propelling means, a flanged plate having a bearing therein fitted over a part of said projected shaft end, means for clamping said plate to said housing, a second flanged plate for coöperatively engaging over said projected shaft end the said flanges being in abutting relation and means for clamping the last mentioned plate to said propelling means.

5. In a construction of the character stated the combination of a casing, a worm-drive mounted therein the worm-shaft of which has a splined end projected through said casing, propelling means, a tubular bearing member fitted over said splined shaft end, a plate having a bearing therein fitted over said member, means for clamping said plate to said casing, a second plate grooved to coöperatively engage said splined shaft end to form a splined joint, and means for clamping the last mentioned plate to said propelling means.

6. In a construction of the character stated the combination of a casing, a worm-drive mounted therein the worm-shaft of which has a splined end projected through said casing, propelling means, a plate fitted with a bearing and a pliable washer fitted over said splined shaft end, means for clamping said plate to said casing, a second plate grooved to coöperatively engage said splined shaft end to provide a splined joint and means for clamping the last mentioned plate to said propelling means.

7. In a construction of the character stated a worm and its complemental shaft, a housing therefor through which projects an end of said shaft, propelling means, a member having a bearing therein fitted over a part of said projected shaft end, means for clamping said member to said housing, a second member for coöperatively engaging over the remainder of said projected shaft end and means for clamping the last mentioned member to said propelling means.

8. In a construction of the character stated a worm and its complemental shaft, a housing therefor through which projects an end of said shaft, propelling means, a plate having a bearing therein fitted over a part of said projected shaft end, means for clamping said plate to said housing, a second plate for coöperatively engaging over said projected shaft end and means for clamping the last mentioned plate to said propelling means.

9. In a construction of the character stated the combination of a casing, a worm-drive mounted therein the worm shaft of which is projected through said casing, propelling means, a disk-like plate having a bearing therein fitted over a part of said shaft, means for clamping said plate to said casing, a second disk-like plate for operatively engaging over said shaft end, and means for clamping the last mentioned plate to said propelling means.

10. In a construction of the character stated the combination of a casing, a worm-drive mounted therein the worm-shaft of which is projected through said casing, propelling means, a plate fitted with a bearing and a pliable washer fitted over said shaft end, means for clamping said plate to said casing, a second plate engaging over said shaft end and means for clamping the last mentioned plate to said propelling means.

11. In a construction of the character stated a worm and its complemental shaft, a housing therefor having an opening through which said shaft projects, a bearing for said shaft fitted within said opening, propelling means, a member fixed to said housing, a bearing in said member in which bearing a part of the projected shaft end is rotatable and a second member fixed to said propelling means for coöperatively engaging the remaining part of said shaft for causing the propelling means and worm to rotate in unison.

12. In a construction of the character stated a worm and its complemental shaft, a housing therefor having an opening through which projects the end of said shaft, a bearing for said shaft fitted within said opening, propelling means, a plate fixed to said housing, a bearing in said plate in which bearing a part of said shaft is rotatable and a second plate fixed to said propelling means for coöperatively engaging the remaining part of said shaft for causing the propelling means and worm to rotate in unison.

In testimony whereof, I have hereunto signed my name.

WILLIAM F. HUDSON.